(12) United States Patent
Mathis et al.

(10) Patent No.: US 8,167,006 B1
(45) Date of Patent: May 1, 2012

(54) AUTOMATED BABY FORMULA DISPENSER

(76) Inventors: Jason Mathis, Killeen, TX (US); James Hester, Killeen, TX (US)

(*) Notice: Subject to any disclaimer, the term of this patent is extended or adjusted under 35 U.S.C. 154(b) by 182 days.

(21) Appl. No.: 12/769,862

(22) Filed: Apr. 29, 2010

(51) Int. Cl.
*B65B 37/00* (2006.01)

(52) U.S. Cl. .......................................... 141/247; 99/281

(58) Field of Classification Search .................. 141/247, 141/69, 82, 381, 144–148, 129, 100, 70; 392/442, 451; 099/323.1, 413, 339, 348, 099/510, 536, 281
See application file for complete search history.

(56) References Cited

U.S. PATENT DOCUMENTS

| 797,144 | A | * | 8/1905 | Nickerson | 141/34 |
|---|---|---|---|---|---|
| 897,420 | A | * | 9/1908 | Small | 141/145 |
| 1,391,488 | A | * | 9/1921 | Miller | 141/145 |
| 2,176,557 | A | * | 10/1939 | Lippold | 53/281 |
| 2,529,672 | A | * | 11/1950 | Black | 219/214 |
| 3,511,166 | A | * | 5/1970 | Bixby, Jr | 99/295 |
| 3,552,454 | A | * | 1/1971 | Deming, Sr. | 141/71 |
| 3,615,673 | A | * | 10/1971 | Black et al. | 426/477 |
| 4,139,125 | A | * | 2/1979 | Arzberger et al. | 222/129.4 |
| 4,328,539 | A | * | 5/1982 | Heeger | 700/15 |
| 4,406,217 | A | * | 9/1983 | Oota | 99/280 |
| 4,676,286 | A | * | 6/1987 | Aiuola et al. | 141/145 |
| 4,694,740 | A | * | 9/1987 | Daloz | 99/323.3 |
| 4,951,719 | A | * | 8/1990 | Wiley et al. | 141/1 |
| 5,000,082 | A | * | 3/1991 | Lassota | 99/304 |
| 5,039,535 | A | * | 8/1991 | Lang et al. | 426/233 |
| 5,063,836 | A | * | 11/1991 | Patel | 99/281 |
| 5,193,139 | A | * | 3/1993 | Schiettecatte | 392/480 |
| 5,315,084 | A | * | 5/1994 | Jensen | 219/689 |
| 5,331,885 | A | * | 7/1994 | Lassota | 99/283 |
| 5,460,078 | A | * | 10/1995 | Weller et al. | 99/295 |
| 5,647,055 | A | * | 7/1997 | Knepler | 392/451 |
| 5,671,325 | A | * | 9/1997 | Roberson | 392/442 |
| 5,797,313 | A | * | 8/1998 | Rothley | 99/483 |
| 5,836,236 | A | * | 11/1998 | Rolfes et al. | 99/290 |
| 5,855,163 | A | * | 1/1999 | DeMars | 219/448.17 |
| 5,970,848 | A | * | 10/1999 | Pelech et al. | 99/291 |
| 5,992,298 | A | * | 11/1999 | Illy et al. | 99/281 |
| 6,095,031 | A | * | 8/2000 | Warne | 99/282 |
| 6,118,933 | A | | 9/2000 | Robertson | |
| 6,170,386 | B1 | * | 1/2001 | Paul | 99/281 |
| 6,173,117 | B1 | * | 1/2001 | Clubb | 392/442 |
| 6,253,028 | B1 | * | 6/2001 | Roberson | 392/442 |
| 6,411,777 | B2 | * | 6/2002 | Roberson | 392/442 |
| 6,412,527 | B1 | * | 7/2002 | Brice | 141/103 |
| 6,439,105 | B1 | * | 8/2002 | Ford | 99/280 |
| 6,711,990 | B1 | | 3/2004 | Harrison | |
| 6,808,089 | B2 | * | 10/2004 | Hashimoto et al. | 222/162 |
| 6,810,929 | B1 | * | 11/2004 | Tansey et al. | 141/231 |
| 6,829,431 | B1 | * | 12/2004 | Haven et al. | 392/441 |
| 6,911,635 | B2 | * | 6/2005 | Shon | 219/708 |
| 6,951,166 | B1 | | 10/2005 | Sickels | |

(Continued)

*Primary Examiner* — Timothy L Maust
*Assistant Examiner* — Ted Kalbach, Jr.

(57) ABSTRACT

An automated baby formula dispenser for preparing bottles of formula at programmable time intervals includes a housing, a formula reservoir designed for holding dry formula, a water reservoir, and a water dispensing line that extends into the formula reservoir. A dispensing nozzle is in environmental communication with the formula reservoir for dispensing mixed baby formula through the dispensing nozzle. A filter prevents unmixed dry formula from being dispensed through the dispensing nozzle. A tray is positioned beneath the dispensing nozzle. Bottles are positionable on the tray and the tray is rotatable such that the bottles are fillable in succession with mixed baby formula dispensed from the dispensing nozzle. A control unit is operationally coupled to the water reservoir and the tray for dispensing water into the formula reservoir and rotating the tray.

12 Claims, 5 Drawing Sheets

U.S. PATENT DOCUMENTS

| | | | |
|---|---|---|---|
| 7,007,813 B2 * | 3/2006 | Yang | 211/131.1 |
| 7,021,197 B2 * | 4/2006 | Chen et al. | 99/291 |
| D534,028 S | 12/2006 | Artis | |
| 7,617,766 B2 * | 11/2009 | Tracy et al. | 99/413 |
| 7,863,546 B2 * | 1/2011 | Hestekin et al. | 219/507 |
| 7,980,422 B2 * | 7/2011 | Lassota | 222/23 |
| 8,006,611 B2 * | 8/2011 | Lin | 99/281 |
| 8,007,847 B2 * | 8/2011 | Biderman et al. | 426/231 |
| 8,009,434 B2 * | 8/2011 | Lin | 361/752 |
| 2005/0230343 A1 * | 10/2005 | Huber | 215/387 |
| 2006/0011067 A1 * | 1/2006 | Spencer | 99/307 |
| 2006/0150821 A1 * | 7/2006 | Paul et al. | 99/279 |
| 2006/0157463 A1 * | 7/2006 | Wiele et al. | 219/214 |
| 2008/0160153 A1 * | 7/2008 | Hestekin et al. | 426/590 |
| 2010/0229729 A1 * | 9/2010 | Garcia et al. | 99/281 |
| 2011/0023996 A1 * | 2/2011 | Laumer et al. | 141/1 |
| 2011/0100228 A1 * | 5/2011 | Rivera | 99/281 |

* cited by examiner

AUTOMATED BABY FORMULA DISPENSER

BACKGROUND OF THE DISCLOSURE

Field of the Disclosure

The disclosure relates to baby formula dispensers and more particularly pertains to a new baby formula dispenser for automatically preparing multiple bottles of baby formula at programmable time intervals.

SUMMARY OF THE DISCLOSURE

An embodiment of the disclosure meets the needs presented above by generally comprising a housing, a formula reservoir positioned in the housing and designed for holding dry formula, a water reservoir positioned in the housing, and a water dispensing line that extends from the water reservoir into the formula reservoir. A dispensing nozzle is coupled to the housing and is in environmental communication with the formula reservoir for dispensing mixed baby formula through the dispensing nozzle. A filter is coupled between the dispensing nozzle and the formula reservoir for preventing unmixed dry formula from being dispensed through the dispensing nozzle. A tray is positioned beneath the dispensing nozzle. A plurality of bottles is provided. The bottles are positionable on the tray. The tray is rotatable such that the bottles are fillable in succession with mixed baby formula dispensed from the dispensing nozzle. A control unit is operationally coupled to the water reservoir and the tray for dispensing water into the formula reservoir and rotating the tray such that the bottles are successively positioned beneath the dispensing nozzle to receive mixed baby formula dispensed through the dispensing nozzle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
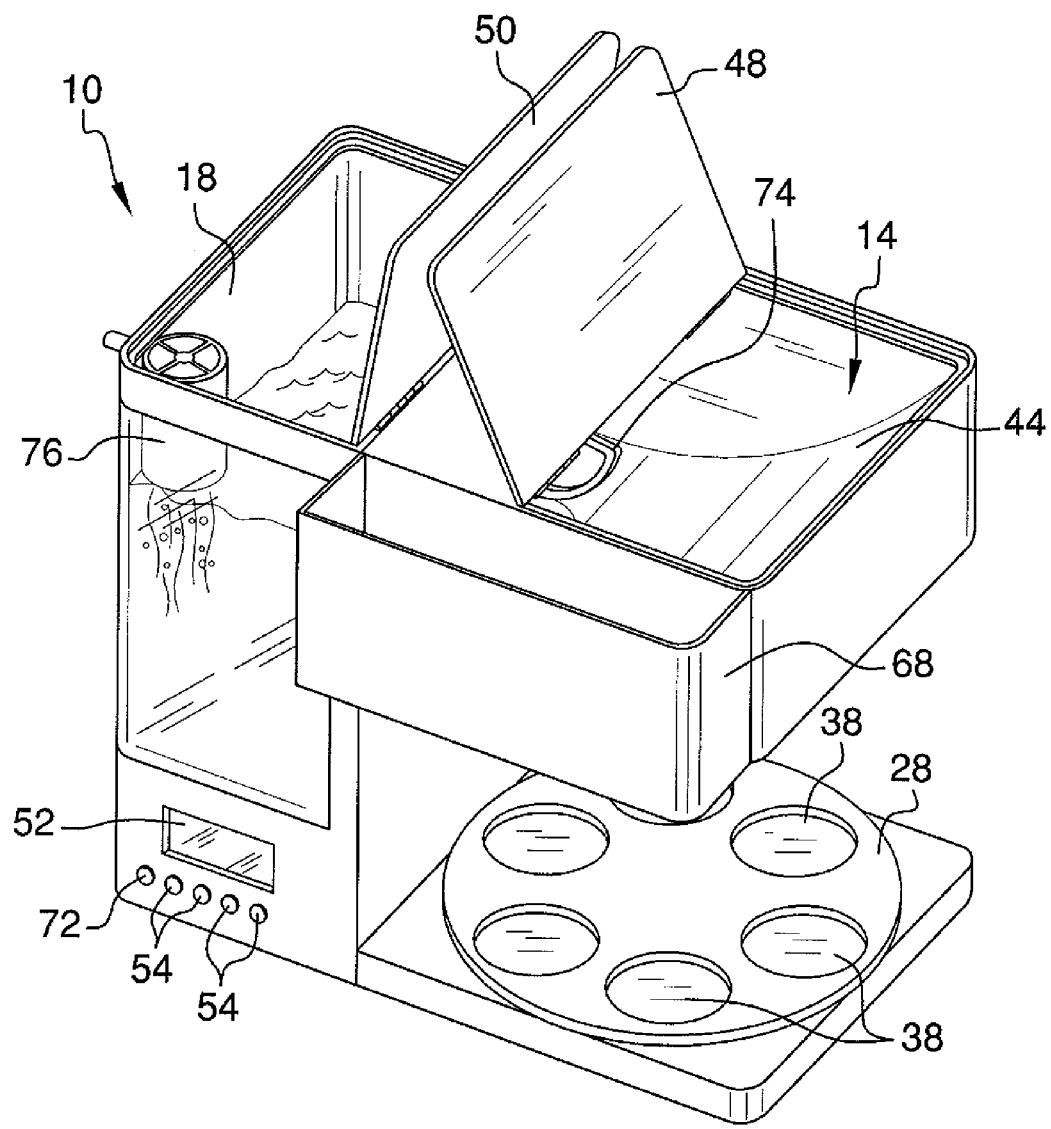
FIG. 1 is a front top side perspective view of an automated baby formula dispenser according to an embodiment of the disclosure.
Figure 2:
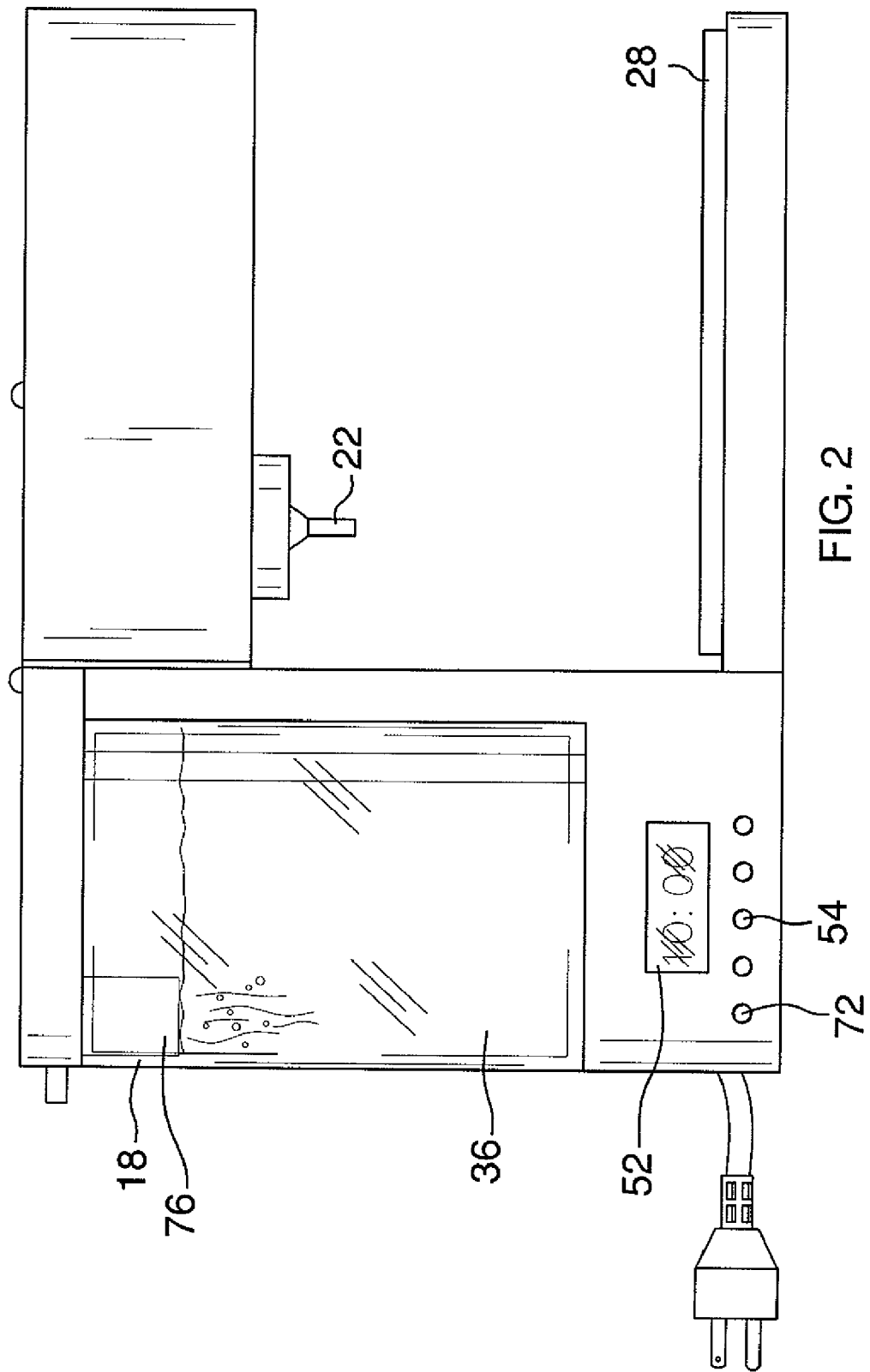
FIG. 2 is a side view of an embodiment of the disclosure.
Figure 3:
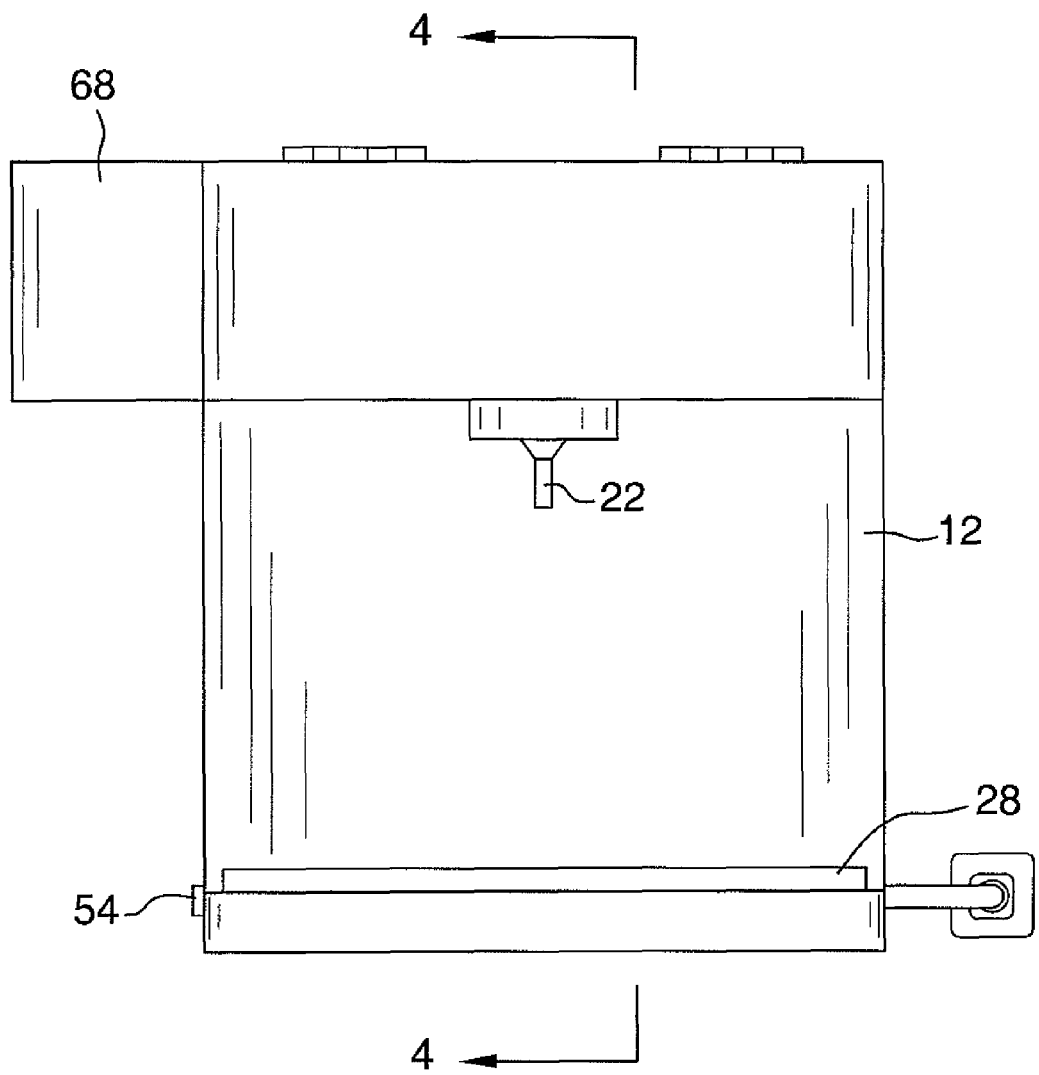
FIG. 3 is a front view of an embodiment of the disclosure.

With reference now to the drawings, and in particular to FIGS. 1 through 5 thereof, a new baby formula dispenser embodying the principles and concepts of an embodiment of the disclosure and generally designated by the reference numeral 10 will be described.

As best illustrated in FIGS. 1 through 5, the automated baby formula dispenser 10 generally comprises a housing 12, a formula reservoir 14 positioned in the housing 12 and designed for holding dry formula 16, a water reservoir 18 positioned in the housing 12, and a water dispensing line 20 that extends from the water reservoir 18 into the formula reservoir 14. A dispensing nozzle 22 is coupled to the housing 12 and is in environmental communication with the formula reservoir 14 for dispensing mixed baby formula 32 through the dispensing nozzle 22. A filter 26 is coupled between the dispensing nozzle 22 and the formula reservoir 14 for preventing unmixed dry formula 16 from being dispensed through the dispensing nozzle 22. A tray 28 is positioned beneath the dispensing nozzle 22. A plurality of bottles 30 is provided. The bottles 30 are positionable on the tray 28. The tray 28 is rotatable such that the bottles 30 are fillable in succession with mixed baby formula 32 dispensed from the dispensing nozzle 22. A control unit 34 is operationally coupled to the water reservoir 18 and the tray 28 for dispensing water 36 into the formula reservoir 14 and rotating the tray 28 such that the bottles 30 are successively positioned beneath the dispensing nozzle 22 to receive mixed baby formula 32 dispensed through the dispensing nozzle 22.

The housing 12 is 16 inches high, 14 inches long, and 12 inches wide. The tray 28 has a plurality of receptors 38 for receiving and holding the bottles 30 in place on the tray 28. The tray 28 is also heatable as a warming tray to keep mixed baby formula 32 at a desired temperature. A holding tray 68 is coupled to the housing 12 for storing nipples, liners, bottle tops and other items associated with baby bottles.

A heating element 40 is operationally coupled to the water dispensing line 20 such that water 36 dispensed into the formula reservoir 14 is heated to a pre-determined temperature. A timing unit 42 is operationally coupled to the control unit 34 for filling the bottles 30 at intermittent times. The timing unit 42 is programmable such that the bottles 30 are filled in succession at pre-selected intermittent programmed times.

The formula reservoir 14 has a sloped wall 44 and a mixing blade 74 and the filter 26 are positioned proximate a base 46 of the sloped wall 44. Thus, dry formula 16 in the formula reservoir 14 is urged to collect proximate the mixing blade 74 to be mixed into mixed baby formula 32 which then passes through the filter 26.

Figure 4:
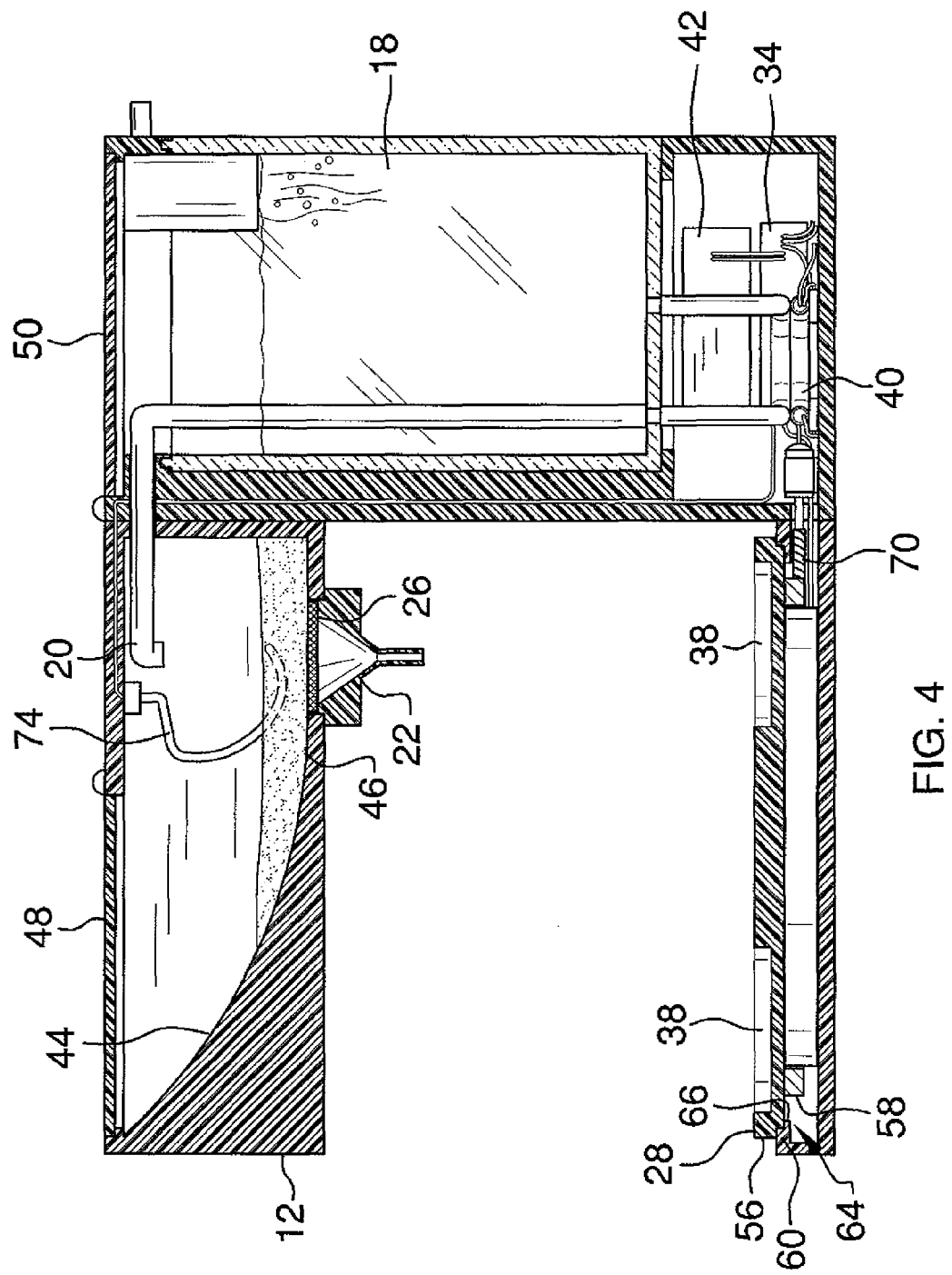
FIG. 4 is a cross-sectional side view of an embodiment of the disclosure taken along line 4-4 of FIG. 3.
Figure 5:
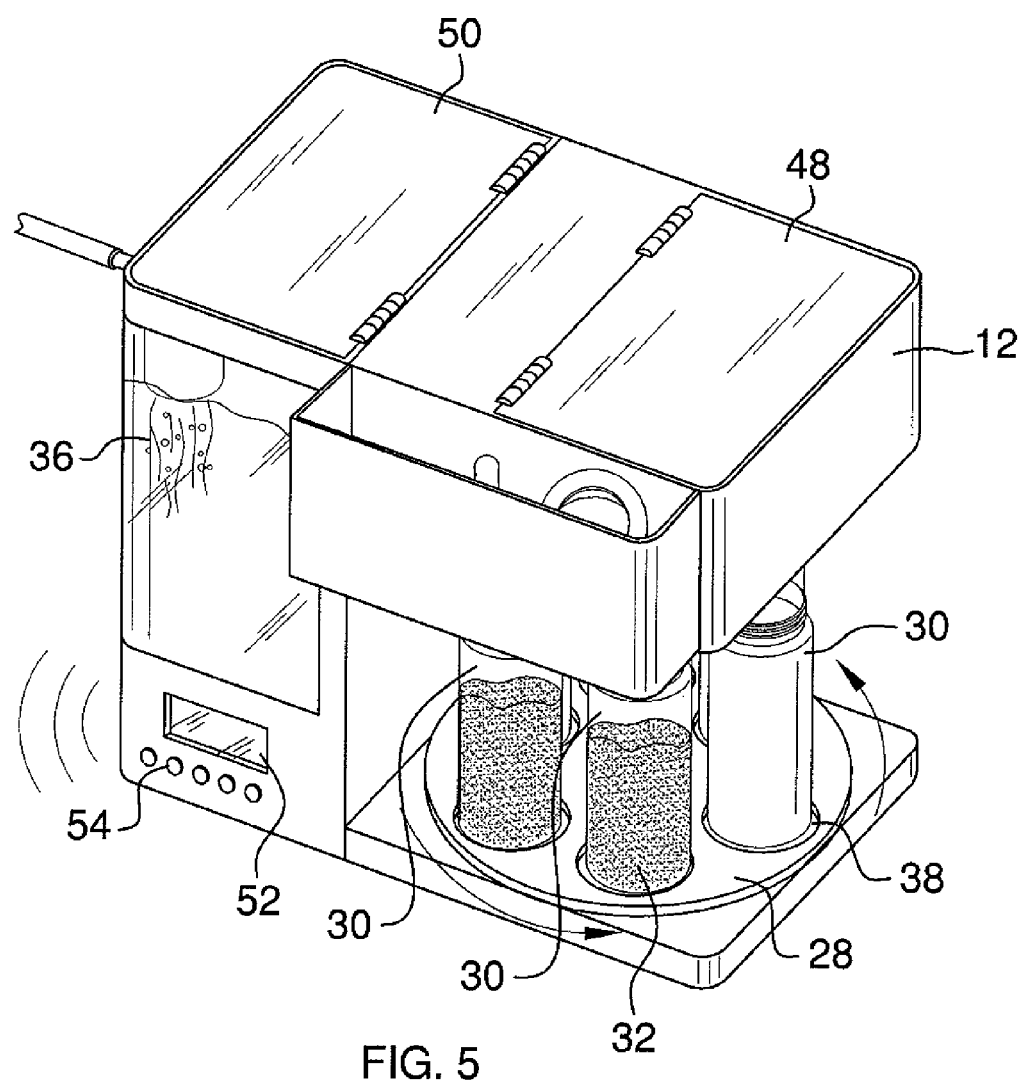
FIG. 5 is a front top side view of an embodiment of the disclosure in use.

A formula reservoir lid 48 is coupled to the housing 12 for selectively providing access to the formula reservoir 14. A water reservoir lid 50 is coupled to the housing 12 for selectively providing access to the water reservoir 18. The formula reservoir lid 48 and water reservoir lid 50 are recessed when in a closed position as shown in FIG. 4. A water filter 76 is provided in the water reservoir 18 to permit filtering of water 36 added to the water reservoir 18.

A display unit 52 and input controls 54 are coupled to the housing 12. The display unit 52 and the input controls 54 are coupled to the housing 12 and operationally coupled to the control unit 34 to facilitate programming and operation of the control unit 34. The input controls 54 include a quick start button 72 operationally coupled to the control unit 34 to produce a single bottle of mixed baby formula 32 by touching only the quick start button 72.

A gear mechanism 70 is positioned in the housing 12. The gear mechanism 70 is operationally coupled to the control unit 34. The tray 28 has an upper portion 56 and a lower portion 58. The lower portion 56 of the tray 28 engages the gear mechanism 70 for rotating the tray 28. The upper portion 56 of the tray 28 has a cutout portion 60 that extends around a lower perimeter 62 of the upper portion 56 of the tray 28. The housing 12 has a tray opening 64 and a circumferential shoulder 66 extends into the tray opening 64 for supporting the tray 28 when the lower perimeter 62 of the tray 28 is matingly received in the tray opening 28.

In use, the formula reservoir 14 is filled with dry formula 16. The water reservoir 18 is filled with water 36. The input controls 54 and display unit 52 are used to program desired times for production of a bottle 30 of mixed formula 32. At the programmed time, the control unit 34 activates the gear mechanism 70 to rotate the tray 28 and activates the heating element 40 to dispense water 36 into the formula reservoir 14.

Water 36 introduced into the formula reservoir 14 mixes with the dry formula 16 to form mixed formula 32 which then passes through the filter 26 and through the dispensing nozzle 22 out into the bottle 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An automated baby formula dispenser comprising:
    a housing;
    a formula reservoir positioned in said housing, said formula reservoir being adapted for holding dry formula;
    a water reservoir positioned in said housing;
    a water dispensing line extending from said water reservoir into said formula reservoir;
    a dispensing nozzle coupled to said housing, said dispensing nozzle being in environmental communication with said formula reservoir for dispensing mixed baby formula through said dispensing nozzle;
    a filter coupled between said dispensing nozzle and said formula reservoir for preventing unmixed dry formula from being dispensed through said dispensing nozzle;
    a tray positioned beneath said dispensing nozzle;
    a plurality of bottles, said bottles being positionable on said tray, said tray being rotatable such that said bottles are fillable in succession with baby formula dispensed from said dispensing nozzle; and
    a control unit operationally coupled to said water reservoir and said tray for dispensing water into said formula reservoir and rotating said tray such that said bottles are successively positioned beneath said dispensing nozzle to receive mixed baby formula dispensed through said dispensing nozzle.

2. The automated baby formula dispenser of claim 1, further including said tray having a plurality of receptors for receiving and holding said bottles in place on said tray.

3. The automated baby formula dispenser of claim 1, further including a heating element operationally coupled to said water dispensing line such that water dispensed into said formula reservoir is heated to a pre-determined temperature.

4. The automated baby formula dispenser of claim 1, further including a timing unit operationally coupled to said control unit for filling said bottles at intermittent times.

5. The automated baby formula dispenser of claim 4, wherein said timing unit is programmable such that said bottles are filled in succession at pre-selected intermittent programmed times.

6. The automated baby formula dispenser of claim 1, wherein said formula reservoir has a sloped wall and said filter is positioned proximate a base of said sloped wall whereby dry formula in said formula reservoir is urged to collect proximate said filter.

7. The automated baby formula dispenser of claim 1, further including a formula reservoir lid coupled to said housing for selectively providing access to said formula reservoir.

8. The automated baby formula dispenser of claim 1, further including a water reservoir lid coupled to said housing for selectively providing access to said water reservoir.

9. The automated baby formula dispenser of claim 1, further including a display unit and input controls coupled to said housing, said display unit and said input controls being coupled to said housing and operationally coupled to said control unit to facilitate programming and operation of said control unit.

10. The automated baby formula dispenser of claim 1, further comprising:
    a gear mechanism positioned in said housing, said gear mechanism being operationally coupled to said control unit;
    said tray having an upper portion and a lower portion, said lower portion of said tray engaging said gear mechanism for rotating said tray.

11. The automated baby formula dispenser of claim 1, further comprising:
    an upper portion of said tray having a cutout portion extending around a lower perimeter of said upper portion of said tray;
    said housing having a tray opening and a circumferential shoulder extending into said tray opening for supporting said tray when said lower perimeter of said tray is matingly received in said tray opening.

12. An automated baby formula dispenser comprising:
    a housing;
    a formula reservoir positioned in said housing, said formula reservoir being adapted for holding dry formula;
    a water reservoir positioned in said housing;
    a water dispensing line extending from said water reservoir into said formula reservoir;
    a dispensing nozzle coupled to said housing, said dispensing nozzle being in environmental communication with said formula reservoir for dispensing mixed baby formula through said dispensing nozzle;
    a filter coupled between said dispensing nozzle and said formula reservoir for preventing unmixed dry formula from being dispensed through said dispensing nozzle;
    a tray positioned beneath said dispensing nozzle;
    a plurality of bottles, said bottles being positionable on said tray, said tray being rotatable such that said bottles are fillable in succession with baby formula dispensed from said dispensing nozzle;
    a control unit operationally coupled to said water reservoir and said tray for dispensing water into said formula reservoir and rotating said tray such that said bottles are successively positioned beneath said dispensing nozzle to receive mixed baby formula dispensed through said dispensing nozzle;

said tray having a plurality of receptors for receiving and holding said bottles in place on said tray;
a heating element operationally coupled to said water dispensing line such that water dispensed into said formula reservoir is heated to a pre-determined temperature;
a timing unit operationally coupled to said control unit for filling said bottles at intermittent times;
wherein said timing unit is programmable such that said bottles are filled in succession at pre-selected intermittent programmed times;
wherein said formula reservoir has a sloped wall and said filter is positioned proximate a base of said sloped wall whereby dry formula in said formula reservoir is urged to collect proximate said filter;
a mixing blade positioned proximate said base of said sloped wall;
a formula reservoir lid coupled to said housing for selectively providing access to said formula reservoir;
a water reservoir lid coupled to said housing for selectively providing access to said water reservoir;
a display unit and input controls coupled to said housing, said display unit and said input controls being coupled to said housing and operationally coupled to said control unit to facilitate programming and operation of said control unit;
a gear mechanism positioned in said housing, said gear mechanism being operationally coupled to said control unit;
said tray having an upper portion and a lower portion, said lower portion of said tray engaging said gear mechanism for rotating said tray;
said upper portion of said tray having a cutout portion extending around a lower perimeter of said upper portion of said tray; and
said housing having a tray opening and a circumferential shoulder extending into said tray opening for supporting said tray when said lower perimeter of said tray is matingly received in said tray opening.

* * * * *